March 19, 1963
H. P. BROOKSBANK ETAL
3,082,064
PRODUCTION OF ALUMINIUM SULPHATE
Filed Oct. 11, 1955
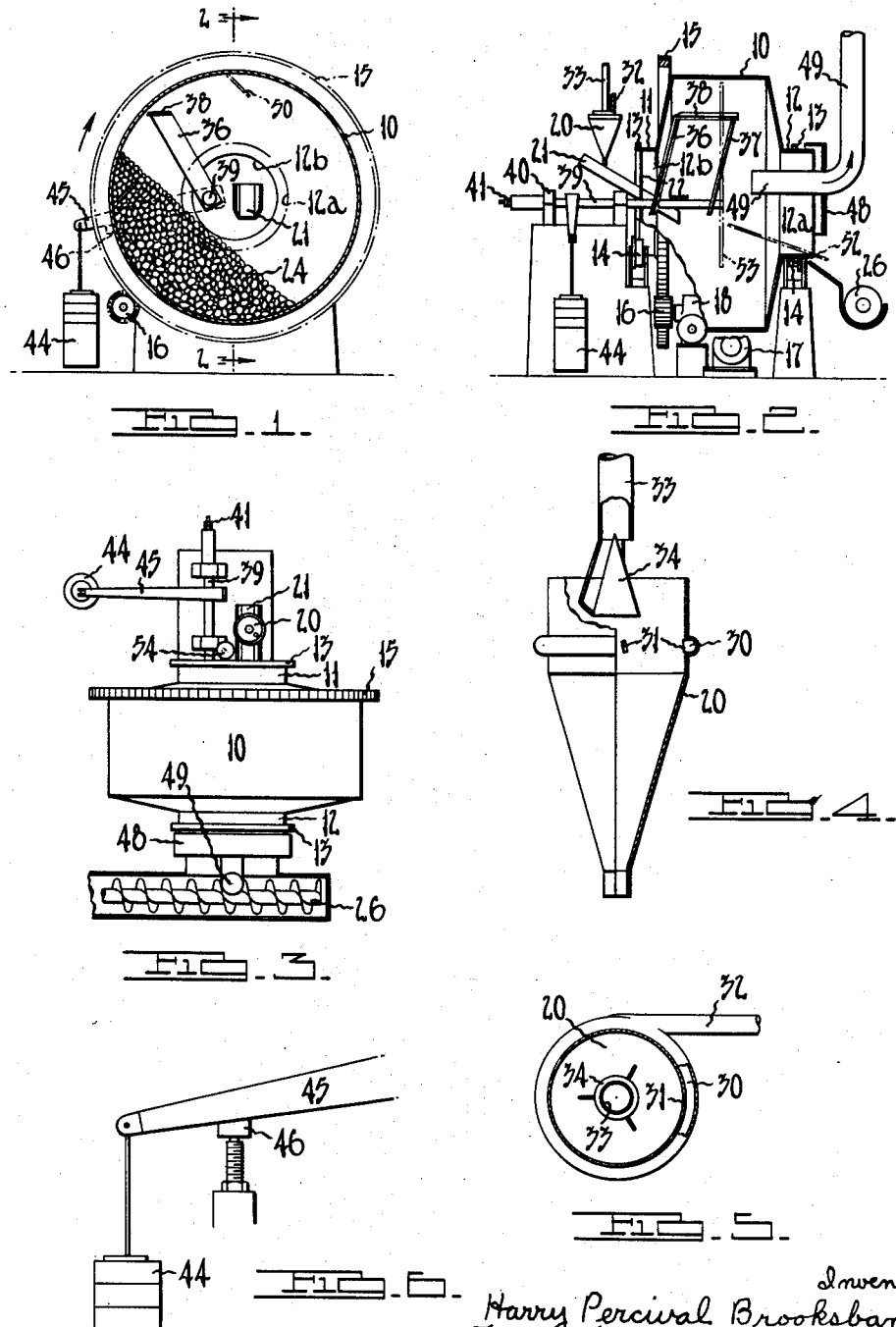
Inventors
Harry Percival Brooksbank
Frederick John Dunster
Michael James Martin
by Pierce, Scheffler & Parker
attys

United States Patent Office 3,082,064
Patented Mar. 19, 1963

3,082,064
PRODUCTION OF ALUMINIUM SULPHATE
Harry Percival Brooksbank, Mordialloc, Victoria, Frederick John Dunster, Newport, Victoria, and Michael James Martin, Canterbury, Victoria, Australia, assignors to Sulphates Limited, Melbourne, Victoria, Australia, a corporation of Australia
Filed Oct. 11, 1955, Ser. No. 539,859
Claims priority, application Great Britain Oct. 14, 1954
6 Claims. (Cl. 23—123)

The common basic process for the production of commercial aluminium sulphate from aluminous ores such as bauxite, bauxitic clay or aluminous clay comprises drying and/or calcining the ore, reducing it to a state of fine subdivision by dry grinding and then mixing it with sulphuric acid in such a proportion that the $Al_2O_3$ plus $Fe_2O_3$ content of these ores is combined with the $SO_3$ of the acid to form the compounds $Al_2(SO_4)_3+xH_2O$ and $Fe_2(SO_4)_3+xH_2O$, the latter being an impurity which results from the presence of iron compounds in the ores.

The reaction between the aluminous ore and the acid is exothermic, but it is usual to raise the temperature to initiate the reaction. When the reaction is carried out with relatively dilute solutions of sulphuric acid having a specific gravity of about 1.3 (equivalent to 32% $SO_3$), additional heating during the digestion process may be required when this is carried out at atmospheric pressure in open vats. Digestion under pressure has also been employed and a neutral or even a basic solution can be obtained by this method but pressure digestors are costly to construct and maintain, particularly when a large output is required.

The time for the digestion varies and is usually about 8 to 24 hours, or even longer, according to the composition of the ore. For instance, the gibbsitic type of bauxites in which the alumina is in the form of the alumina trihydrate $(Al_2O_3 3H_2O)$ reacts much more readily than the alumina in clays or in bauxites of the monohydrate type. Furthermore, it is difficult to obtain a "neutral" product having no free or excess acid above that required for the theoretical combination of the oxides of iron and alumina by digestion at atmospheric pressure. It is usual to neutralise or sweeten the liquors from the digestor by the addition of freshly precipitated pure aluminium hydrate, or by adding an excess quantity of the aluminous clays or bauxite towards the end of the digestion process.

Alternatively, the process is also carried out in a countercurrent series system, and the almost neutral aluminium sulphate liquor is allowed to react on the fresh charge of aluminous material.

After the digestion reaction is completed, the aluminium sulphate liquor is separated from the insoluble residue by filtration, sedimentation or a combination of both and the liquor thus recovered, and having a specific gravity of about 1.35, is evaporated to a specific gravity of approximately 1.6. It is then cast on to pouring trays or moulds where it solidifies, after which it is either sold in ingot form or is barred up from the pouring floor, spalled by manual labour and then fed to a suitable crushing plant to reduce it to a size suitable for commercial use in the manufacture of paper and for water purification plants.

The operation heretofore described is a time-consuming one and requires considerable tank capacity both in the reaction vats and in the settling vats, entails heavy capital expenditure and lock-up of materials in process, as well as necessitating close control over the chemical reaction.

It is also well known to mix relatively large quantities of pulverised aluminous ores with sulphuric acid of a specific gravity of about 1.700 (containing 63% of $SO_3$) and to allow the mixture to stand whereby the ingredients react. This reaction is exothermic so that in a period of some 20 to 30 minutes, or even less in the case of bauxite, the mass will solidify and ultimately set to a solid, which on cooling, has almost the strength and texture of a cement-sand concrete. Consequently the product is difficult to remove if it is allowed to set in reaction vats or the like. The solid material is known as "alum cake" and after crushing is used as such for some purposes including water purification. It is also used for the production of commercial aluminium sulphate for which purpose it is leached in hot water so that the insoluble residues may be separated by sedimentation or filtration. It is however extremely difficult to obtain a neutral product from the aforesaid reaction without further heating.

Attempts have been made to carry out the same reaction in dens similar to those employed in the superphosphate industry but the apparatus is costly and the upkeep on the cutting knives is high. Moreover, the product must be held in the dens for a considerable time to obtain approximate neutrality.

Now the object of this invention is to provide an improved method of and apparatus for producing crude aluminium sulphate, in the form of or similar to alum cake and from which commercial aluminium sulphate may be readily produced.

Accordingly, the invention includes the method of producing aluminium sulphate comprising continuously mixing finely divided aluminous material with sulphuric acid of a suitable concentration and immediately thereafter directing the mixture on to a continuously agitated mass of solid bodies—preferably nodules of the solidified material resulting from the reaction.

The reaction between the mixed materials takes place mainly on or adjacent to the said agitated bodies, and, as the reaction is an exothermic one, a considerable rise in temperature takes place in the agitated charge. By suitably controlling the degree of agitation and the rate of feed of the mixture, fresh nodules are continuously formed and balling up of the material is prevented.

More particularly, the nodulising operation is preferably performed within a drum type reactor having its axis disposed horizontally and which is rotated continuously so that the nodules cascade therein, this drum being preferably relatively large in diameter. The incoming mixture is preferably discharged downwardly onto the thus agitated charge and nodules are continuously discharged from one end of the drum through an axial opening of a diameter such that a considerable charge of nodules is at all times retained within the reactor.

Considerable quantities of steam are evolved in the reaction and the discharge of this steam from the reactor is preferably regulated and controlled in such a manner as to prevent the ingress of cold air as it is important to maintain as high a temperature as is practicable to accelerate the reaction.

If desired, the nodules may be caused, by suitably arranged deflectors or baffles in the drum, to fall freely in the central lower portion thereof after they have been raised by frictional contact with the drum surface, in which case the incoming mixture of reacting materials is preferably directed onto the falling nodules. Also when the nodules are caused to fall more or less freely in the indicated manner, an inclined sizing screen may be arranged therebelow and within the lower portion of the reactor so as to direct oversized nodules laterally through one end thereof, while undersized nodules pass therethrough whereby they are subjected to further treatment within the reactor. The said screen may be continuously vibrated to facilitate this sizing operation.

The pulverised aluminous material and acid may be mixed in any suitable type of flash mixer, e.g. a vortex type mixer, immediately prior to entering the reactor the acid being preferably fed under pressure and the aluminous material being preferably delivered by gravity. Suitable interlocks are preferably provided in the acid and ore circuits so that the failure of supply of one or the other will shut down the feed and mixing apparatus.

In lieu of supplying the pulverised aluminous material to the mixer in the dry condition it may alternatively be supplied thereto in the form of a slurry with water or with a saturated solution of aluminium sulphate and this has the advantage that dusting troubles are avoided by wet grinding the aluminous material in ball mills or the like. Thus the material may be ground in the presence of a saturated solution of aluminium sulphate, or, water may be used, in which case solid aluminium sulphate is preferably added to the mixture so that it dissolves to form a saturated solution. The slurry and/or the sulphuric acid, can be heated prior to being mixed and the high temperature developed and maintained in the reactor is capable of evaporating the excess water added with the slurry.

Whilst it is not necessary to apply heat to the reactor when gibbsitic bauxites are used as the aluminous material, it may be an advantage to do so when using aluminous clays or the aforesaid aluminous slurry and this may be accomplished by directing into the reactor the combustion products from a suitable oil or gas burner. Alternatively the reactor may be heated externally.

If desired, the aforesaid mass of nodules or the like may contain a proportion of balls or other like bodies of inert material such as acid resisting metal, porcelain, glass or flint, in which case the material removed from the reactor may be treated in a ball mill or the like, after which, the inert bodies are separated and returned to the reactor either cold or in a preheated condition.

The ground product of the aforesaid operation is free-flowing in character and so is particularly suitable for use in chemical dry feeders.

In the following more particular description, reference is made to the accompanying drawings in which:

FIGURE 1 is a view in sectional elevation of the preferred form of apparatus according to the invention.

FIGURE 2 is a view in side elevation and is partly a section on the line 2—2 of FIGURE 1.

FIGURE 3 is a view in plan.

FIGURE 4 is a view in elevation and partly in section of a mixer, and is drawn to a larger scale.

FIGURE 5 is a view in plan of the mixer, and

FIGURE 6 is a view in elevation of a detail.

The apparatus shown in the drawings comprises an internally lead-lined or other suitably constructed acid resisting drum 10 supported for rotation about a horizontal axis, this drum being advantageously about 8′ 0″ in diameter and about 3′ 6″ or more in length.

One end of the drum, hereinafter termed the inlet end, is formed with a short axial extension 11, while the opposite discharge end is similarly provided with an axial extension 12, the diameter of the discharge opening 12a in the latter being conveniently about 3′ 6″ when the drum is 8′ 0″ in diameter, while an opening 12b of smaller diameter is formed in the opposite end of the drum at the inner end of the extension 11.

A ring 13 encircles each of the extensions 11 and 12 and engages a corresponding pair of supporting rollers 14.

A gear ring 15 secured to the drum meshes with a pinion 16 to which motion is imparted from an electric motor 17 through reduction gearing 18 whereby when the apparatus is in use, the drum is constantly rotated in the direction of the arrow in FIGURE 1 at a suitable low speed which may be about 2 r.p.m.

A mixer 20 for sulphuric acid and aluminous material is suitably supported adjacent to the inlet end of the drum and above the axis thereof and the mixed materials pass from the lower end of the mixer into the upper end of an inclined chute 21 by which they are discharged through a fixed cover disc 22, into the adjacent end of the drum.

When the apparatus is in use the drum contains a substantial mass 24 of nodules of the reaction product viz. filter alum. These nodules are frictionally displaced in the direction of rotation of the drum and are thus maintained in a continuously agitated cascading condition and the incoming mixture is deposited thereon in a reactive condition, whereby the reaction occurs principally in contact therewith and fresh nodules are formed.

The nodules spill continuously through the discharge opening 12a at a rate corresponding to the rate at which the mixed materials enter the drum, and are directed into a screw conveyor 26 by which they are delivered either to a crushing and bagging plant or to leaching vats (not shown) according to the nature of the desired end product.

Any suitable type of mixer may be used, but a vortex type mixer as shown in FIGURES 2, 3, 4 and 5 has given good results in practice and is preferred. This mixer comprises a body 20 of inverted conical form provided near its upper end with an annular passage 30 which communicates with the interior of the body by a series of obliquely arranged jet openings 31, so that the acid which is supplied under pressure to the annular passage 30 by a pipe 32 enters the body with a swirling motion.

Dry pulverised aluminous material is delivered gravitationally at the requisite rate into the top of the body 20 through a coaxially arranged pipe 33 having a conical spreader 34 arranged at the lower end thereof.

It is found that the material tends to adhere to, and build up as a layer on, the surface of the drum and for this purpose a scraper comprising side arms 36, 37 and a cross member 38 is arranged therein. The inner ends of the side arms are secured to a longitudinally disposed shaft 39 which extends eccentrically into the inlet end of the drum and is supported in bearings 40 externally thereof.

The side arm 36 serves as a scraper for the inlet end of the drum and for this purpose the shaft is adjustable longitudinally and is retained in the requisite position by nuts 41. Endwise displacement of the drum by the scraper is prevented by a thrust roller 54.

The scraper is loaded by weights 44 which are suspended from a radial arm 45 secured to the shaft 39 externally of the drum and this arm normally rests on an adjustable stop 46 (FIGURE 6) which is so positioned, that the scraper member 38 is maintained out of contact with the metal surface of the drum to obviate damage to, or wear on the lead lining thereof. Thus a layer of the reacted material which may conveniently be about one half inch in thickness, is permitted by the scraper to build up on the inner periphery of the drum.

The discharge end of the drum is partly covered by a fixed shield 48 to restrict the escape of steam and the inflow of cold air and a steam discharge pipe 49 fitted with a regulating damper extends through the shield.

In one series of tests carried out with the apparatus, 7,800 lbs. of sulphuric acid, having a specific gravity of 1.68, and 4,200 lbs. of pulverised calcined bauxite, were supplied per hour to the mixer 20 and approximately 11,500 lbs. of nodules were discharged in the same period at a temperature of 120° C. The majority of these nodules were between ¼ and ¾ of an inch in diameter. The temperature of the steam within the drum was also about 120° C. which is equivalent to the temperature in a pressure digester operating at a pressure of 25 lbs. per square inch. Consequently the reaction is accelerated and is practically complete when the nodules leave the drum.

The reaction takes place principally adjacent to the inlet end of the drum and consequently if desired, the interior of the latter may be subdivided into two compartments by an internal partition 53 as indicated in broken lines in FIGURE 2, this partition being conveniently carried by the scraper shaft 39, it being understood that the partition does not extend to the bottom of the drum so that the nodules may pass freely below it. When the drum is subdivided in this manner, the set nodules may be conditioned, for example by superheated steam, while contained within the compartment adjacent to the discharge end of the drum. In these circumstances the drum may require to be of increased length.

According to one modification, the inner periphery of the drum is provided with inclined lifting vanes, which are indicated in broken lines at 50 in FIGURE 1 whereby the nodules are lifted and caused to fall freely onto an inclined sizing screen 51 shown in broken lines in FIGURE 2. Thus oversize nodules are discharged from the screen into the conveyor while undersize nodules pass through the screen and are subjected to further treatment.

It has been determined in recent years that finely divided colloidal matter may advantageously be used in conjunction with aluminium sulphate for the coagulation, clarification and filtration of water, and in many instances prepared silica is added in conjunction with the aluminium sulphate. In this regard the acid-alumina content of the product obtained by the present invention, can be held constant and it is found that the presence of insoluble matter contained therein, whether derived directly from the insoluble portion of the aluminous ores or deliberately added to the mixture prior to entering the reactor, is advantageous particularly in water purification. Furthermore, the water soluble alumina in the product from the reactor can be maintained at a concentration of over 18% $Al_2O_3$ when using suitable bauxite. On the other hand it is difficult to obtain this concentration by the evaporation of aluminium sulphate liquors.

Commercial sulphate of alumina intended to be used in dry feeders is usually made basic, that is with an alumina content in excess of that required to combine with the sulphuric acid, for the reason that aluminium sulphate containing even a slight proportion of free acid is deliquescent in nature. The product of the present invention however, does not suffer from this disadvantage.

While it is preferred to perform the above-described nodulising operation in a continuously rotated drum as above described, the invention is not confined thereto, because any other suitable apparatus providing a constantly agitated bed or mass of nodules may be used in lieu thereof.

The present invention therefore greatly facilitates the production of filter alum in a condition which is immediately suitable for many commercial uses thereof, while in addition the apparatus is compact and operates continuously, whereas as previously stated it is the present practice to manufacture the material in batches and to cast the molten product in floor moulds or the like which require considerable space.

We claim:

1. The method of producing hydrated aluminium sulphate, containing up to about 18% $Al_2O_3$, in nodular form, which consists essentially in the steps of continuously cascading a charge of bodies consisting essentially of nodules of hydrated aluminium sulphate containing up to about 18% $Al_2O_3$, continuously mixing finely divided aluminuous material consisting essentially of aluminium hydroxide with sulphuric acid at a suitable concentration, in substantially stoichiometric proportions for the formation of hydrated aluminium sulphate containing up to about 18% $Al_2O_3$, immediately thereafter directing the substantially unreacted mixture onto said cascading nodules whereby the mixture reacts in contact with the nodules and is formed at least partly into fresh nodules, maintaining the nodules in cascading movement until substantial completion of the reaction, and substantially continuously removing nodules from said charge at a rate corresponding to the rate at which the mixture is supplied thereto.

2. The method of producing hydrated aluminium sulphate, containing up to about 18% $Al_2O_3$, in nodular form, which consists essentially in the steps of continuously cascading a charge of bodies consisting essentially of nodules of hydrated aluminium sulphate containing up to about 18% $Al_2O_3$, continuously mixing finely divided aluminous material consisting essentially of aluminium hydroxide with sulphuric acid at a suitable concentration, in substantially stoichiometric proportions for the formation of hydrated aluminium sulphate containing up to about 18% $Al_2O_3$, immediately thereafter directing the substantially unreacted mixture onto said cascading nodules whereby the mixture reacts, with the release of steam, in contact with the nodules and is formed at least partly into fresh nodules, maintaining the nodules in cascading movement until substantial completion of the reaction, substantially continuously removing nodules from said charge at a rate corresponding to the rate at which the mixture is supplied thereto, and confining in contact with said charge an atmosphere of steam produced by the reaction.

3. The method of producing hydrated aluminium sulphate, containing up to about 18% $Al_2O_3$, in nodular form, which consists essentially in the steps of continuously cascading a charge of bodies consisting essentially of nodules of hydrated aluminium sulphate, containing up to about 18% $Al_2O_3$, admixed with inert bodies, continuously mixing finely divided aluminous material consisting essentially of aluminium hydroxide with sulphuric acid at a suitable concentration, in substantially stoichiometric proportions for the formation of hydrated aluminium sulphate containing up to about 18% $Al_2O_3$, immediately thereafter directing the substantially unreacted mixture, in the form of a spray or stream, onto said cascading nodules whereby the mixture reacts in contact with the nodules and is formed at least partly into fresh nodules, maintaining the nodules in cascading movement until substantial completion of the reaction, substantially continuously removing nodules and inert bodies from said charge at a rate corresponding to the rate at which the mixture is supplied thereto, separating the inert bodies from the hydrated aluminium sulphate thus removed, and returning said inert bodies to the charge.

4. The method of producing hydrated aluminium sulphate, containing up to about 18% $Al_2O_3$, in nodular form, which consists essentially in the steps of continuously cascading a charge of bodies consisting essentially of nodules of hydrated aluminium sulphate containing up to about 18% $Al_2O_3$, continuously mixing dry, finely divided aluminous ore with sulphuric acid at a suitable concentration, in substantially stoichiometric proportions for the formation of hydrated aluminium sulphate containing up to about 18% $Al_2O_3$, immediately thereafter directing the substantially unreacted mixture onto said cascading nodules whereby the mixture reacts in contact with the nodules and is formed at least partly into fresh nodules, maintaining the nodules in cascading movement until substantial completion of the reaction, and substantially continuously removing nodules from said charge at a rate corresponding to the rate at which the mixture is supplied thereto.

5. The method of producing hydrated aluminium sulphate, containing up to about 18% $Al_2O_3$, in nodular form, which consists essentially in the steps of continuously cascading a charge of bodies consisting essentially of nodules of hydrated aluminium sulphate containing up to about 18% $Al_2O_3$, continuously mixing an aqueous slurry of finely divided aluminous ore with sulphuric acid at a suitable concentration, in substantially stoichiometric proportions for the formation of hydrated aluminium sulphate containing up to about 18% $Al_2O_3$, immediately thereafter directing the substantially unreacted mixture onto said cascading nodules whereby the mixture reacts in contact with the nodules and is formed at least partly into fresh nodules, maintaining the nodules in cascading movement until substantial completion of the reaction, and substantially continuously removing nodules from said charge at a rate corresponding to the rate at which the mixture is supplied thereto.

6. The method of producing hydrated aluminium sulphate, containing up to about 18% $Al_2O_3$, in nodular form, which consists essentially in the steps of maintaining a charge of bodies consisting essentially of nodules of hydrated aluminium sulphate, containing up to about 18% $Al_2O_3$, in a substantially hollow rotating drum wherein said bodies undergo continuous sliding and cascading movements, continuously mixing finely divided aluminous ore with sulphuric acid at a suitable concentration, in substantially stoichiometric proportions for the formation of hydrated aluminium sulphate containing up to about 18% $Al_2O_3$, immediately thereafter directing the substantially unreacted mixture onto said cascading nodules whereby the mixture reacts in contact with the nodules and is formed at least partly into fresh nodules, maintaning the nodules in cascading movement until substantial completion of the reaction, and substantially continuously removing nodules from said charge at a rate corresponding to the rate at which the mixture is supplied thereto.

References Cited in the file of this patent

UNITED STATES PATENTS

| | | |
|---|---|---|
| 1,485,507 | Juer | Mar. 4, 1924 |
| 1,834,693 | Frischer | Dec. 1, 1931 |
| 1,985,810 | Wight et al. | Dec. 25, 1934 |
| 2,350,575 | Tomlinson et al. | June 6, 1944 |

FOREIGN PATENTS

| | | |
|---|---|---|
| 514,149 | Great Britain | Oct. 31, 1939 |